United States Patent
Martineau (10) Patent No.: US 9,094,287 B2
(45) Date of Patent: Jul. 28, 2015

(54) SYSTEM AND METHOD FOR PROVIDING A TOPOLOGY PATH

(71) Applicant: CISCO TECHNOLOGY, INC., San Jose, CA (US)

(72) Inventor: Etienne Martineau, Gatineau (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 229 days.

(21) Appl. No.: 13/917,536

(22) Filed: Jun. 13, 2013

(65) Prior Publication Data

US 2014/0369229 A1    Dec. 18, 2014

(51) Int. Cl.
*H04L 12/751* (2013.01)

(52) U.S. Cl.
CPC ..................................... *H04L 45/02* (2013.01)

(58) Field of Classification Search
CPC ....................................................... H04L 45/02
USPC ......................................................... 370/254
See application file for complete search history.

(56) References Cited

U.S. PATENT DOCUMENTS

| | | | |
|---|---|---|---|
| 7,743,197 B2 | 6/2010 | Chavan et al. | |
| 7,752,360 B2 | 7/2010 | Galles | |
| 7,836,238 B2 | 11/2010 | Freimuth et al. | |
| 7,958,298 B2 | 6/2011 | Deshpande et al. | |
| 8,122,177 B1 | 2/2012 | Puranik | |
| 8,144,582 B2 | 3/2012 | Brown et al. | |
| 2010/0257269 A1* | 10/2010 | Clark | 709/226 |
| 2012/0311568 A1* | 12/2012 | Jansen | 718/1 |
| 2014/0130038 A1* | 5/2014 | Lucovsky et al. | 717/176 |

* cited by examiner

*Primary Examiner* — Melvin Marcelo
(74) *Attorney, Agent, or Firm* — Patent Capital Group (57) ABSTRACT

A method, apparatus, computer readable medium, and system that includes receiving a request for a topology path for a designated device, the request comprising a bus device function representation that identifies the designated device, determining the topology path based, at least in part, on the bus device function representation such that the topology path provides a deterministic representation of a route to the designated device, and replying with the topology path is disclosed.

20 Claims, 7 Drawing Sheets

SYSTEM AND METHOD FOR PROVIDING A TOPOLOGY PATH

TECHNICAL FIELD

This disclosure relates in general to the field of communications and, more particularly, to a system and a method for providing a topology path.

BACKGROUND

A trend towards virtualization in the information technology (IT) arena is driving the development of many virtualization technologies, such as network virtualization. Network virtualization solutions can consolidate multiple physical networks into one virtual network. They can also logically segment a single physical network into multiple logical networks. Partitions can be added to rapidly scale the network for business needs. Network virtualization represents a new IT paradigm, challenging existing physical network deployment models. Network virtualization offers many benefits, such as expanding the availability of single IT assets to multiple users, managing multiple IT assets as a single resource, providing dedicated virtual networks for applications, etc. This can lead to revenue generation, expense reduction, and customer satisfaction.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

One or more embodiments may provide an apparatus, a method, a computer readable medium, a non-transitory computer readable medium, a computer program product, and/or the like, to receive a request for a topology path for a designated device, the request comprising a bus device function representation that identifies the designated device, determine the topology path based, at least in part, on the bus device function representation such that the topology path provides a deterministic representation of a route to the designated device, and reply with the topology path. One or more embodiments may provide an apparatus, a method, a computer readable medium, a non-transitory computer readable medium, a computer program product, and/or the like, comprising means for receiving a request for a topology path for a designated device, the request comprising a bus device function representation that identifies the designated device, means for determining the topology path based, at least in part, on the bus device function representation such that the topology path provides a deterministic representation of a route to the designated device, and means for replying with the topology path.

Example Embodiments

Figure 1:
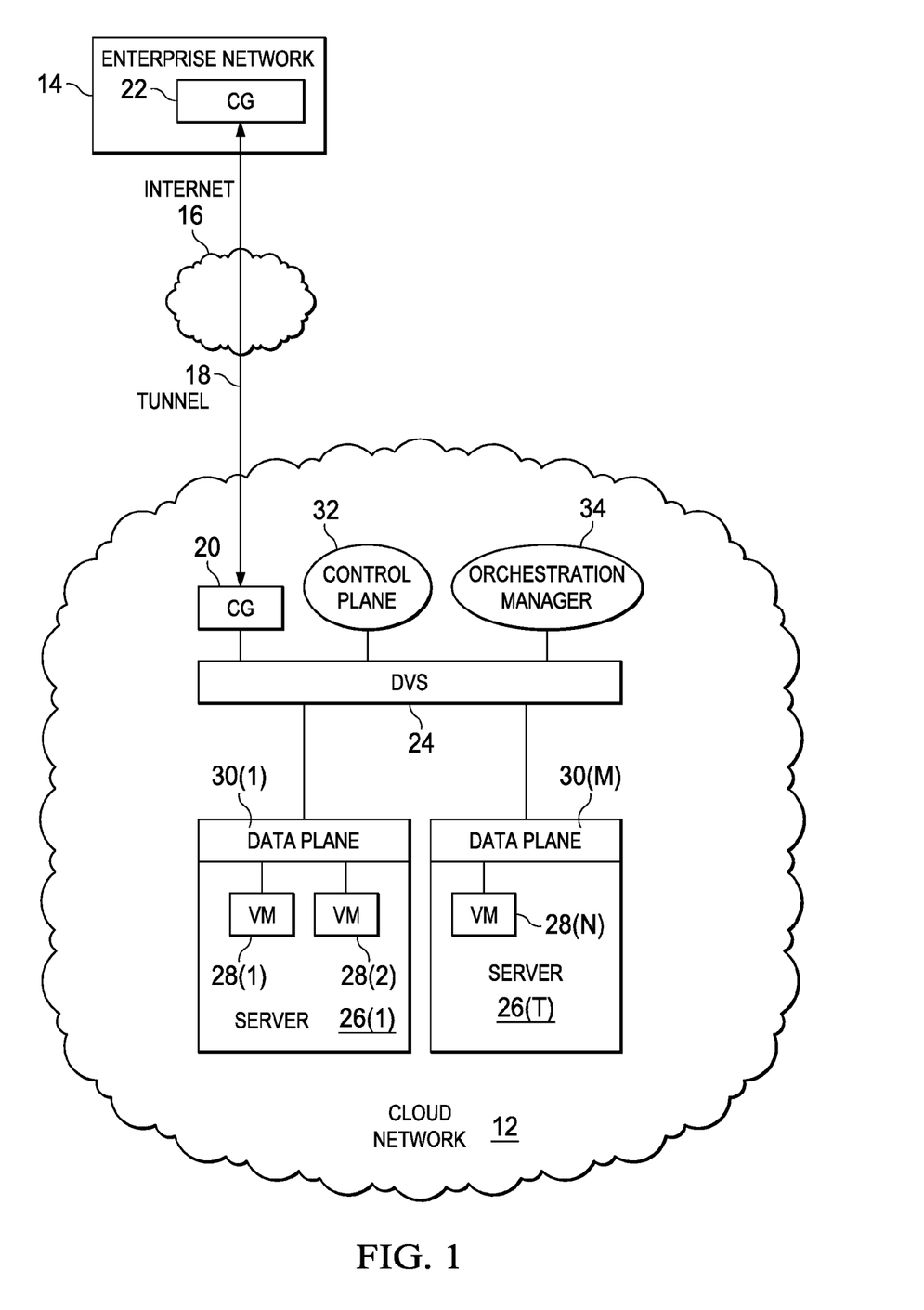
FIG. 1 is a simplified block diagram illustrating a system for migrating application virtual machines in a network environment.

FIG. 1 is a simplified block diagram illustrating a communication system 10 for establishing translation for virtual machines in a network environment in accordance with one example embodiment. FIG. 1 illustrates a cloud network 12 in communication with an enterprise network 14 over a public network, such as an Internet 16, via a tunnel 18. Tunnel 18 may connect a cloud gateway 20 in cloud network 12 with a corresponding cloud gateway 22 in enterprise network 14. Cloud gateway 20 in cloud network 12 may communicate with one or more distributed virtual switches (DVS) 24. DVS 24 may span many servers 26(1)-26(T), functioning as a single virtual switch across all associated hosts in cloud network 12. Servers 26(1)-26(T) may host virtual machines (VMs) 28(1)-28(N), enabled by one or more data planes 30(1)-30(M). A data plane may relate to a Virtual Ethernet Module (VEM). For example, server 26(1) may be provisioned with data plane 30(1) that provides network capability to VMs 28(1) and 28(2), server 26(T) may be provisioned with data plane 30(M) that provides networking capability to VM 28(N), and/or the like.

DVS 24 may be provisioned with a control plane 32 that controls data planes 30(1)-30(M) as one virtual switch. Control plane 32 may relate to a Virtual Supervisor Module (VSM). data planes 30(1)-30(M) may be configured through control plane 32 to perform Layer 2 switching and advanced networking functions, such as port-channels, quality of service (QoS), security (e.g., private virtual local area network (VLAN), port security, etc.), and monitoring (e.g., Netflow, switch port analyzer (SPAN), encapsulated remote SPAN, etc.). Network administrators may have the capability to define configurations on all data planes 30(1)-30(M) in enterprise network 12 from a single interface orchestration manager 34 coupled to control plane 32. Orchestration manager 34 may relate to a vCenter. In at least one example embodiment, orchestration manager 34 is integrated with a server (not shown) that provides a single console to operate and manage control plane 32. Together, DVS 24, VMs 28(1)-28(N), data planes 30(1)-30(M), control plane 32 and orchestration manager 34 may form one or more networks.

In at least one example embodiment, cloud network 12 and enterprise network 14 form a hybrid cloud network environment. Enterprise network 14 may be any private network, such as a data center network, operated and controlled by a single entity or organization. In at least one example embodiment, cloud network 12 is a collection of hardware and software ("cloud infrastructure") forming a shared pool of configurable computing resources (e.g., networks, servers, storage, applications, services, etc.) that can be suitably provisioned to provide on-demand self-service, network access, resource pooling, elasticity and measured service, among other features. In at least one example embodiment, cloud network 12 may be deployed as a private cloud (e.g., infrastructure operated by a single enterprise/organization), community cloud (e.g., infrastructure shared by several organizations to support a specific community that has shared concerns), public cloud (e.g., infrastructure made available to the general public), or a suitable combination of two or more disparate types of clouds.

Cloud network 12 may be managed by a cloud service provider, who can provide enterprise network 14 with access to cloud network 14 and authorization to set up tunnel 18 in accordance with a predetermined service level agreement (SLA). In particular, resources (e.g., network, storage, etc.) within cloud network 12 may not be controlled by the entity or organization controlling enterprise network 14; rather, the resources may be allocated to enterprise network 14 according to the SLA with the cloud service provider. For example, enterprise network 14 may be signed up for using a fixed amount of Central Processing Unit (CPU) processors, storage, and network services. Moreover, cloud network 12 may provide a single operating system (e.g., Linux) across all its servers, utilizing a particular hypervisor (e.g., Xen), without regard for compatibility with operating systems or hypervisors of VMs 28(1)-28(N) in enterprise network 14.

DVS 24 may be extended into enterprise network 14 through a data plane residing in enterprise network 14, which may be substantially a counterpart of data planes 30(1)-30(M) in cloud network 12. Such data plane may be embedded in cloud gateway 22 and may enable switching inter-VM traffic at enterprise network 14. Cloud gateway 22 may facilitate establishing tunnel 18 with allocated cloud resources according to the SLA.

Even though the example of communication 10 depicts network 12 as a cloud network, network 12 may be an enterprise network, or any other type of network. Similarly, even though the example of communication 10 depicts network 14 as an enterprise network, network 14 may be a cloud network, or any other type of network.

For purposes of illustrating the techniques of communication system 10, it is important to understand the communications in a given system such as the system shown in FIG. 1. The following information may be viewed as explanatory information for the purpose of providing clarity. Such information is offered earnestly for purposes of explanation only and, accordingly, should not be construed in any way to limit the broad scope of the present disclosure and its potential applications.

Until recently, data center networks were designed under the assumption that each end node was connected to an access port of a switch in the network and the end node corresponded to one server running a single instance of an operating system (OS) and a single instance of a given application. Another assumption was that the application and its associated OS would be persistently bound to that specific physical server and would rarely, if ever, move onto another physical server. In recent years, introduction of server virtualization has invalidated these assumptions and posed some new challenges for data center network designs. Server virtualization modifies both of the previously mentioned assumptions of data center network design by allowing multiple operating systems to transparently share the same physical server and input/output (I/O) devices. Local switching is used between different VMs within the same server, invalidating the assumption that each network access port corresponds to a single physical server running a single instance of an OS. Moreover, by abstracting hardware from software, virtualization effectively enables VMs to become mobile, which means that a VM can be moved from one physical server to another within the data center or even across multiple data centers or networks, including from within an enterprise network to a cloud extension.

The consequences of such level of mobility on the network are not trivial. Mobility of VMs can pose stringent requirements on the underlying network infrastructure. For example, it could require that both the source and destination hosts be part of the same set of Layer 2 domains (e.g., VLANs). Features such as port security, IEEE 802.1x, and Internet Protocol (IP) source guard that maintain state information based on the physical port may not be deployed in virtualized networks, as the VM may move at any instant. Further, as VMs move from one physical server to another, it may be desirable that all the network policies defined in the network for the VM (for example, ACLS) be consistently applied, without regard to the location of the VM in the network.

Data planes, which include virtual interfaces that maintain network configuration attributes, security, and statistics across mobility events, may be dynamically provisioned within virtualized networks based on network policies stored in the DVS as a result of VM provisioning operations by a hypervisor management layer (e.g., orchestration manager). Data planes could be the virtual equivalent of physical network access ports. Data planes may follow virtual network interface cards (vNICs) when VMs move from one physical server to another. The movement can be performed while maintaining port configuration and state, including NetFlow, port statistics, and any Switched Port Analyzer (SPAN) session. By virtualizing the network access port with data planes, transparent mobility of VMs across different physical servers and different physical access-layer switches within an enterprise network may be possible. However, when VMs are moved away from the enterprise network into a cloud extension, operated by an entity different from the entity that operates the enterprise network, certain issues could arise.

Enterprises may subscribe to IT capacity and applications in a cloud to extend the enterprise network based on demand and workload. In the cloud, software applications can be delivered transparently to the user (e.g., the user is effectively unaware of where the processing takes place). Additionally, virtual environments and compute capacity can be delivered as a service when business units require them, without the added cost of purchasing new hardware. Moreover, excess capacity can be easily returned to the pool of resources once it is no longer needed. However, there are at least three hurdles to adoption of cloud computing as an extension of the enterprise network: security, privacy, and compliance.

Moreover, when an enterprise application VM is migrated to the cloud, issues may arise in connection with incompatibility of the hypervisor hosting the VMs in the enterprise versus the hypervisor hosting the VMs in the cloud. For example, the hypervisor (e.g., vMWare™) used in the enterprise network could be different from the hypervisor (e.g., WindRiver™) used in the cloud. Sizeable effort may be needed to convert the VM from one hypervisor format to another, and many times such conversion processes are not reversible. Thus, once the VM is migrated to the cloud, it may not be possible to migrate it back to the enterprise network.

Figure 2:
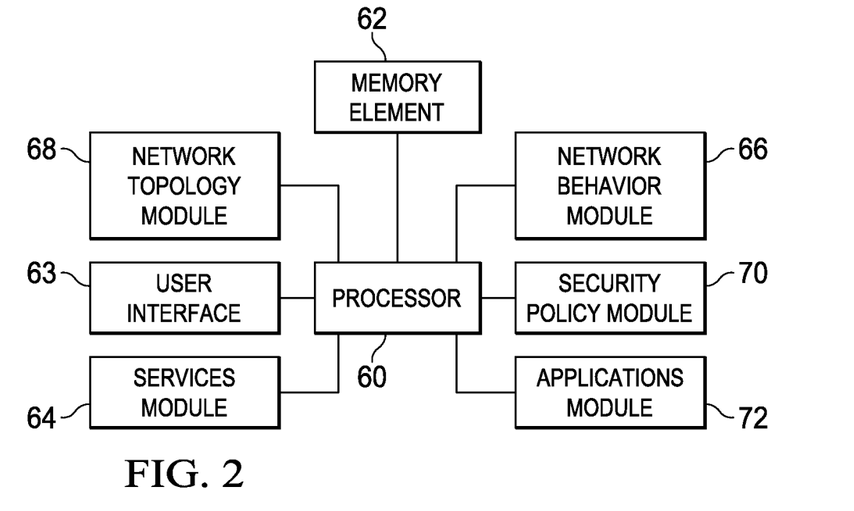
FIG. 2 is a simplified block diagram illustrating example details of the system in accordance with one embodiment.

FIG. 2 is a simplified block diagram illustrating example details of at least one example embodiment of communication system 10. Switch 36 may be a component of cloud manager 30, for example a component that comprises, at least part of, DVS 24 of FIG. 1. In various embodiments, switch 36 may use network resources provided by cloud network 12 to manage network resources.

In the example of FIG. 2, switch 36 includes a processor 60 and a memory element 62. In at least one example embodiment, processor 60 and memory element 62 is part of the infrastructure of cloud network 12. In at least one example embodiment, processor 60 and memory element 62 are dedicated for use exclusively by switch 36. In at least one example embodiment, processor 60 and memory element 62 are one or more processors and memory elements respectively, that are shared between various other components within cloud network 12. In at least one example embodiment, processor 60 represents a virtual central processing unit (vCPU) and memory element 62 represents virtual memory allocated to switch 36 according to resource allocation specifications within cloud network 12.

In at least one example embodiment, switch 36 comprises a user interface 63. User interface 63 may be a suitable GUI, or CLI, as appropriate. Switch 36 may comprise various modules, including a services module 64, a network behavior module 66, a network topology module 68, a security policy module 70, and an applications module 72. Switch 36 may appropriately use local virtualization management to provision network resources and manage network behavior.

In at least one example embodiment, virtual machines communicate with each other. For example, one virtual machine may utilize one or more services offered by another virtual machine. In at least one example embodiment, virtual machines communicate with each other by way of tunnels. There are many protocols that a virtual machine may utilize with respect to a tunnel. For example, a virtual machine may utilize VLAN protocol, virtual extensible local area network (VXLAN) protocol, generic routing encapsulation (GRE) protocol, network virtualization using generic routing encapsulation (NVGRE), and/or the like.

Many networks utilize a diverse set of virtual machines. As utilization of virtual machines to satisfy computing needs have proliferated, there has become an increasing availability of various virtual machine implementations that provide many different services. Many networks utilize a multitude of different types of virtual machines. In some circumstances, these diverse virtual machines utilize different protocols. For example, a network administrator may desire to utilize a first virtual machine that utilizes VXLAN, and a second virtual machine that utilizes NVGRE. It may be desirable for the network administrator to be able to deploy these virtual machines without being limited by their reliance on different protocols. For example, it may be desirable to provide a solution to allow for communication between these virtual machines.

In some circumstances, topology of the network may change, based on changing needs of the users relying on the network, based on changing environmental factors associated with the network, etc. In many circumstances, topology of the network may be continually changing to adapt to changing requirements and circumstances. Network administrators may modify the network topology by way of migrating virtual machines. In at least one example embodiment, migrating a virtual machine relates to changing placement of the virtual machine within the network topology. For example, a network administrator may remove a virtual machine from one server and place the virtual machine on another server. In at least one example embodiment, placement refers to a position in the network topology where a virtual machine resides. For example, a placement of a virtual machine may be on a specified server. For at least the reason that migration of virtual machines has become a common practice to manage networks, it may be desirable to allow for communication between virtual machines that utilize different protocols in a manner that allows for adaptability as migration of virtual machines occurs.

Figure 3:
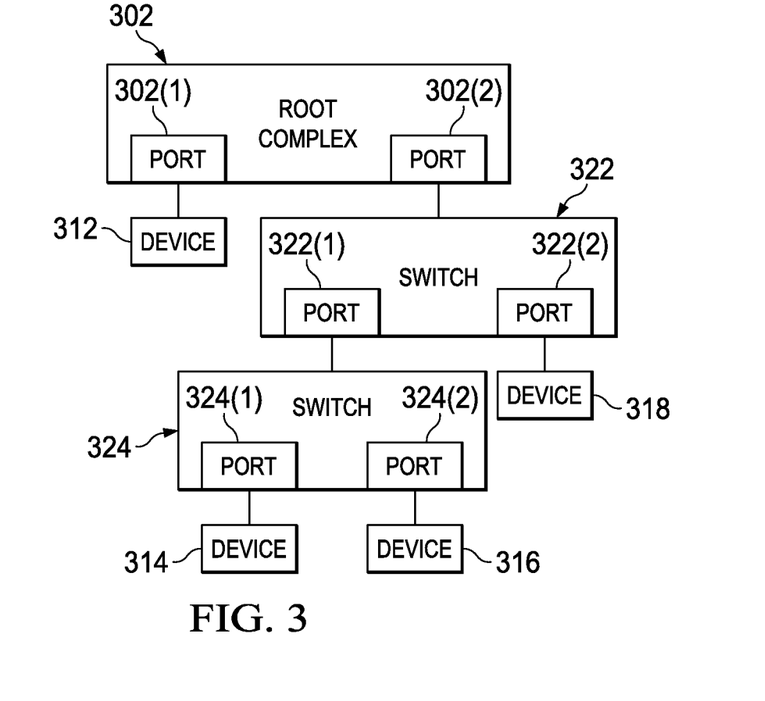
FIG. 3 is a diagram illustrating modules associated with a device network according to at least one example embodiment.

FIG. 3 is a diagram illustrating modules associated with a device network according to at least one example embodiment. The example of FIG. 3 is merely an example of modules associated with a device network, and does not limit the scope of the claims. For example, operations attributed to a component may vary, number of components may vary, composition of a component may vary, and/or the like. For example, in some example embodiments, operations attributable to one component of the example of FIG. 3 may be allocated to one or more other components.

In the example of FIG. 3, root complex 302 is in communication with device 312, by way of port 302(1), and switch 322, by way of port 302(2). In at least one example embodiment, a root complex relates to a device that connects a processor and/or memory subsystem to one or more devices, such as a switch, a server, and/or the like. A root complex may generate transaction requests on behalf of the processor, which may be interconnected through a local bus. Root complex functionality may be implemented as a discrete device, or may be integrated with the processor. A root complex may contain more than one port. In some circumstances, multiple devices may be connected to ports on the root complex. In some circumstances, multiple devices may be cascaded. A switch may relate to a device that links one or more network segments, one or more devices, and/or the like, with each other.

A port may relate to software construct that may serve as a communications endpoint in a communication network. For example, a device, such as a switch, a root complex, an endpoint device, etc. may communicate with another device by way of a port. In many circumstances, communication between a device and another device utilizes a port of the device for sending information and another port of the other device for receiving information. In the example of FIG. 3, for simplicity, ports in which a device communicates upstream have not been shown. However, in at least one example embodiment, each device has at least one port in which the device communicates with at least one upstream device.

In the example of FIG. 3, switch 322 is in communication with switch 324, by way of port 322(1), and device 318 by way of port 322(2). Switch 324 is in communication with device 314, by way of port 324(1), and device 316 by way of port 324(2). Even though the example of FIG. 3 depicts each switch as having 2 ports, the number of ports comprised by a switch may vary, and does limit the claims in any way.

In at least one example embodiment, a device may identify its ports by way of a port number. In at least one example embodiment, a port number is a number that uniquely identifies a port within the scope of the device which comprises the port. For example, a device may have a port 0, and another device may also have a port 0. In this manner, port 0 may be a unique identifier within the scope of each individual device, but may not necessarily be a unique identifier across different devices. In this manner, the port number of the two or more ports of port 302(1), port 322(1), port 324(1), etc. may be the same port number. For example, port 302(1) may have a port number of 7, port 322(1) may have a port number of 7, port 324(1) may have a port number of 7, and/or the like. In this manner, utilization of a port number may often be dependent upon identification of the device in which the port resides. For example, an address, such as an internet protocol (IP) address, may designate a device that is associated with a port number. In this manner, a port number may identify a port of the designated device, for example to be used for communication with another device.

It can be seen that communication may flow from the root complex to an endpoint device by way of one or more other devices, such as a switch. For example, communication may flow from the root complex to device 316 by way of switch 322 and switch 324. In this manner, there may be a data stream hierarchy such that a device that is closer to the root complex than another device may be considered to be upstream from the other device. Similarly, a device that is further from the root complex than another device may be considered to be downstream from the other device. For example, switch 322, switch 324, and endpoint 316 may be downstream from root complex 302, switch 324 and device 316 may be downstream from switch 322, and device 316 may be downstream from switch 324. In at least one example embodiment, the path that information takes when sent from one device to another relate to a route. For example, a route may relate to each port and device involved in a communication between a device and another device. For example, a device may designate another device to receive information, from which to request information, and/or the like. For example, a device may designate device 318 to receive information. In such an example, the route may involve root complex 302, port 302(2), a port in which switch 322 communicates with root complex 302, switch 322, and port 322(2).

Figure 4A:
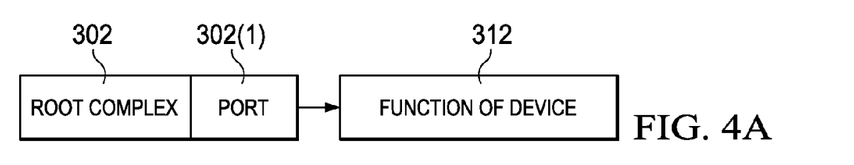
FIGS. 4A-4D are diagrams illustrating topology paths according to at least one example embodiment.
Figure 4B:
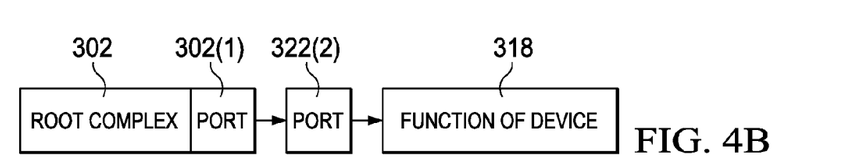

FIGS. 4A-4B are diagrams illustrating topology paths according to at least one example embodiment. The examples of FIGS. 4A-4B are merely examples of topology paths, and do not limit the scope of the claims. For example, identification of route information may vary, identification of a component may vary, representation of a component may vary, and/or the like.

There are many ways in which a device may specify another device in a network for communication. For example, a device may be identified by way of a bus device function representation. In at least one example embodiment, a bus device function representation relates to a representation of a device that comprises a hexadecimal bus number, followed by a colon character, followed by a hexadecimal device number, followed by a period character, followed by a hexadecimal function number. For example, a bus device function representation of a device AF on a bus 04, for a function 32 may be 04:AF.32.

In at least one example embodiment, a bus number relates to a number that is designated to identify a bus within a domain. For example, the bus number may identify a communication path associated with a plurality of ports. The bus number may be dynamically assigned by a device associated with control of the network in which the bus is comprised, such as a control plane, an orchestration manager, a hypervisor, and/or the like.

In at least one example embodiment, a device number relates to a number that is designated to identify a device within a domain. For example, the device number may identify a device associated with a bus. The device number may be dynamically assigned by a device associated with control of the network in which the bus is comprised, such as a control plane, an orchestration manager, a hypervisor, and/or the like.

In at least one example embodiment, a function number relates to a designation of a function of a device associated with a communication. For example, the function number may designate a function to be performed by the device upon receipt of communication, such as retrieval of information, storage of information, performance of an action, and/or the like.

In at least one example embodiment, an enumeration algorithm is utilized to assign bus numbers, device numbers, and/or the like, for purposes of bus device function representations. For example, buses and devices that are present at the time of the operation of the enumeration algorithm may be assigned bus numbers, device numbers, and/or the like.

In some circumstances, it may be desirable to communicate, from a domain, with a device in a different domain. In such cross-domain circumstances, the bus device function representation may not necessarily uniquely identify a device. For example, a device in a domain may be assigned a device number, and a different device in a different domain may be assigned the same device number. In such an example, a bus associated with the device of the domain may be assigned a bus number, and a different bus of the different domain may be assigned the same bus number. In this manner, it may be difficult to identify the whether communication is intended for the device or the other device.

In some circumstances, it may be desirable to specify a particular device in a particular network with which to communicate. In such an example, it may be desirable to have a deterministic and consistent mapping of the device within the network. For example, it may be desirable to designate a device for communication by way of its placement in the network.

In at least one example embodiment, communication with a device is based, at least in part, on a topology path for the device. In at least one example embodiment, a topology path for a designated device provides a deterministic representation of a route to the designated device. For example, the topology path may indicate routing decisions to be made as information passes through a network to allow the information to arrive at the designated device.

In at least one example embodiment, a topology path comprises a root port identifier, a root port number, and a function number. The function number may be similar as described regarding the function number of the bus device function representation. In at least one example embodiment, the function number of the topology path corresponds with a function number of the designated device. The root port identifier may be an identifier that designates a particular root complex for communication. In at least one example embodiment, the root port identifier relates to an identifier that uniquely identifies the designated root complex within a domain that comprises the root complex. In at least one example embodiment, the root port number relates to a port number of the designated root complex that is associated with communication with the designated device.

It may be desirable to reduce the amount of memory associated with a topology path. Therefore, it may be desirable to avoid including representation of information that may be readily inferred based on information included in the topology map. For example, it may be desirable to represent the root port number without necessarily representing the device to which the root port number is associated. In this manner, the root port number may be sufficient to allow for communication to be properly routed, at least in part, to the device.

The example of FIG. 4A is an illustration that is indicative of information represented by a topology path associated with device 312 of FIG. 3. The topology path illustration of FIG. 4A identifies root complex 302, port 302(1) of root complex 302, and a function of device 312.

In at least one example embodiment, a topology path relates to a set of characters that are indicative of the route to the designated device. For example, the topology path may comprise a character representation of the root port identifier, a character representation of the root port number, a character representation of the function number, and/or the like. In at least one example embodiment, the topology path comprises the root port number subsequent to the root port identifier. In at least one example embodiment, the topology path comprises the function number subsequent to the root port number.

In some circumstances, it may be desirable to readily distinguish individual elements of a topology path. In at least one example embodiment, the topology path comprises a root port identifier prefix. In such an example, the root port identifier prefix may identify a value prefixed by the root port identifier prefix as the root port identifier. For example, the root port identifier prefix may identify the following value in the topology path to be the root port identifier. In some circumstances, it may be desirable to identify that a set of characters relates to a topology path. In at least one example embodiment, the root port identifier prefix relates to the first character of the topology path. In this manner, the root port identifier may identify information subsequent to the root port identifier prefix to be the topology path. In at least one example embodiment, the root port identifier prefix relates to a vertical bar character, such as the "|" character.

In at least one example embodiment, the topology path comprises a root port number prefix. In such an example, the root port number prefix may identify a value prefixed by the root port number prefix as the root port number. For example, the root port number prefix may identify the following value in the topology path to be the root port number. In at least one example embodiment, the root port number prefix relates to a colon character, such as the ":" character.

In at least one example embodiment, the topology path comprises a function number prefix. In such an example, the function number prefix may identify a value prefixed by the function number prefix as the function number. For example, the function number prefix may identify the following value in the topology path to be the function number. In at least one example embodiment, the function number prefix relates to a period character, such as the "." character.

In the example of FIG. 4A, port 302(1) may correspond to port number 2 of root complex 302, and root complex 302 may be designated by root port identifier 4321. In such an example, a topology path associated with function 5 of device 312 may be |4321:2.5.

In some circumstances, it may be desirable for the topology path to comprise information indicative of one or more devices that may be along the route between the root complex and the designated device. In at least one example embodiment, the topology path comprises one or more downstream port numbers. In at least one example embodiment, the downstream port number identifies a port of a downstream component that comprises a part of the route to the designated device.

The example of FIG. 4B is an illustration that is indicative of information represented by a topology path associated with device 318 of FIG. 3. The topology path illustration of FIG. 4B identifies root complex 302, port 302(2) of root complex 302, port 322(2) of switch 322, and a function of device 318.

Figure 4C:
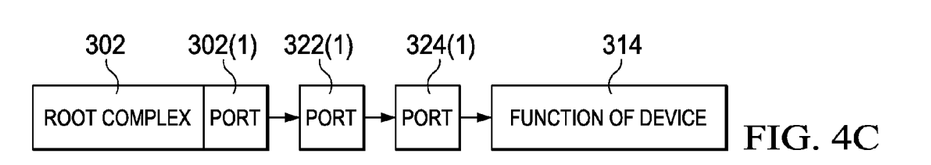

The example of FIG. 4C is an illustration that is indicative of information represented by a topology path associated with device 314 of FIG. 3. The topology path illustration of FIG. 4C identifies root complex 302, port 302(2) of root complex 302, port 322(1) of switch 322, port 324(1) of switch 324, and a function of device 314.

Figure 4D:
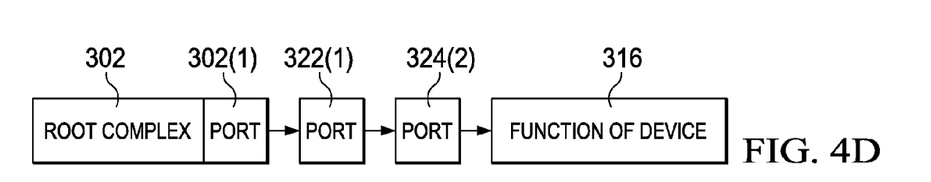

The example of FIG. 4D is an illustration that is indicative of information represented by a topology path associated with device 316 of FIG. 3. The topology path illustration of FIG. 4D identifies root complex 302, port 302(2) of root complex 302, port 322(1) of switch 322, port 324(2) of switch 324, and a function of device 316.

In at least one example embodiment, the topology path comprises a downstream port number prefix. In such an example, the downstream port number prefix identifies a value prefixed by the downstream port number prefix as the downstream port number. For example, the downstream port number prefix may identify the following value in the topology path to be the downstream port number. In at least one example embodiment, the downstream port number prefix relates to an underscore character, such as the "_" character. In at least one example embodiment, the topology path comprises the downstream port number subsequent to the root port number. In at least one example embodiment, the topology path comprises the downstream port number prior to the function number.

In the example of FIG. 4B, port 302(2) may correspond to port number 7 of root complex 302, root complex 302 may be designated by root port identifier 4321, and port 322(2) may correspond to port number 12 of switch 322. In such an example, a topology path associated with function 6 of device 318 may be |4321:7_12.6.

In some circumstances, there may be a plurality of downstream devices between the root complex and the designated device. In at least one example embodiment, the topology path comprises another downstream port number such that the ordering of the downstream port number and the other downstream port number reflects, at least part of, the route between the root port number and the designated device. For example, a downstream device that is encountered in the route prior to another downstream device may be represented in the topology path prior to the representation of the other downstream device. For example, if a downstream port number relates to a port in the route that is between another downstream port number and the root port, the topology path may comprise a representation of the other downstream port number subsequent to a representation of the port number.

In the example of FIG. 4C, port 302(2) may correspond to port number 7 of root complex 302, root complex 302 may be designated by root port identifier 4321, port 322(1) may correspond to port number 5 of switch 322, and port 324(1) may correspond to port number 5 of switch 324. In such an example, a topology path associated with function 6 of device 314 may be |4321:7_5_5.6.

In the example of FIG. 4D, port 302(2) may correspond to port number 7 of root complex 302, root complex 302 may be designated by root port identifier 4321, port 322(1) may correspond to port number 5 of switch 322, and port 324(2) may correspond to port number 7 of switch 324. In such an example, a topology path associated with function 2 of device 316 may be |4321:7_5_7.2.

Figure 5:
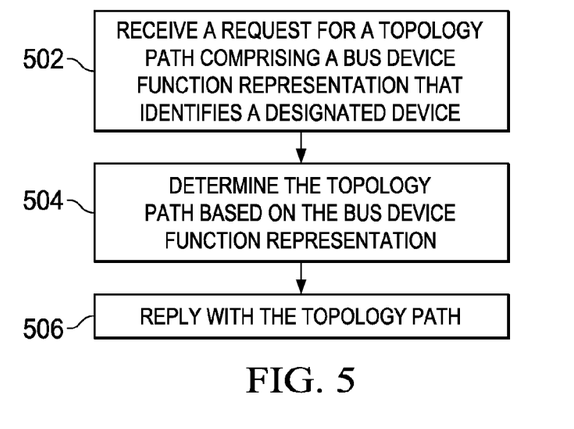
FIG. 5 is a flow diagram illustrating activities associated with providing a topology path according to at least one example embodiment.

FIG. 5 is a flow diagram illustrating activities associated with providing a topology path according to at least one example embodiment. In at least one example embodiment, there is a set of operations that corresponds to the activities of FIG. 5. An apparatus, for example switch 36 of FIG. 2, or a portion thereof, may utilize the set of operations. The apparatus may comprise means, including, for example processor 60 of FIG. 2, for performance of such operations. In an example embodiment, an apparatus, for example switch 36 of FIG. 2, is transformed by having memory, for example memory element 62 of FIG. 2, comprising computer code configured to, working with a processor, for example processor 60 of FIG. 2, cause the apparatus to perform set of operations of FIG. 5.

In some circumstances, it may be desirable to provide a way for a program, a device, and/or the like, to discover a topology path for a designated device. For example, it may be desirable to perform a request for the topology path and receive a response that conveys the topology path. In at least one example embodiment, a program may send a request for a topology path that designates a device, and receive the topology path. In at least one example embodiment, the device is designated by way of a bus device function representation of the device.

For example, there may be a sysfs entry that provides the topology path. Such a sysfs entry may receive a bus device function representation of the device and provide the topology path based, at least in part, on the bus device function representation of the device. For example, there may be a sysfs entry "/sys/bus/pci/devices/B:D.F/hwid" of:

```
\-[0000:00]-+-00.0    5520/5500/X58 I/O Hub to ESI Port
            +-00.1-[0000:38]----00.0    Device 2345
            +-00.2-[0000:39]----00.0    Device 2346
            +-00.3-[0000:3a]----00.0    Device 2347
            +-00.4-[0000:3b]----00.0    Device 2348
            +-00.5-[0000:3c]----00.0    Device 2349
            +-00.6-[0000:3d]----00.0    Device 234a
            +-00.7-[0000:3e]----00.0    Device 234b
            +-01.0-[0000:03]-
```

For example, based, at least in part, on the example sysfs entry above, a request of "root@example-home:/sys/bus/pci/devices/0000:38:00.0# cat hwid" may result in receiving a topology path of "|3420:0.0".

In another example, based, at least in part, on the example sysfs entry above, a request of "root@example-home:/sys/bus/pci/devices/0000:39:00.0# cat hwid" may result in receiving a topology path of "|3421:0.0".

At block 502, the apparatus receives a request for a topology path for a designated device, the request comprising a bus device function representation that identifies the designated device. The request may relate to a function call, a message, and/or the like. The receipt of the request may relate to receipt of a message, invocation of a function call, and/or the like. The topology path, the designated device, and the bus device function representation may be similar as described regarding FIG. 3, FIGS. 4A-4D, and/or the like.

At block 504, the apparatus determines the topology path based, at least in part, on the bus device function representation such that the topology path provides a deterministic representation of a route to the designated device. The determination and the topology path may be similar as described regarding FIG. 4A-4D. At block 506, the apparatus replies with the topology path. The reply may be a function call return, a message response, and/or the like. The reply may comprise a transmission of the topology path.

Hence, certain embodiments of the present disclosure can readily be applied to any PCI or Peripheral Component Interconnect Express (PCIe) protocols. The 'PCI topology path' provides a layer on top of the B:D.F notation used in the Linux operating system in order to provide a consistent and deterministic mapping of a device on a given PCI topology in a virtualized or non-virtualized environment. More specifically, for PCIe, an endpoint device can be connected to a downstream port. The downstream port may be part of the root complex directly, which in that case, can be referred as the root port. The downstream port may also be part of a PCIe switch and, in that case, that PCIe switch is itself connected to a downstream port, which could be part of the root complex directly, or yet another PCIe switch. The 'PCI topology path' is variable in length and can be obtained by walking the PCIe topology from the device to the root port. Each time a downstream port is found, the corresponding port number field is read, part of the PCI_EXP_LNKCAP capability register, and written into the 'PCI topology path' identifier. At the end of this iterative process, the PCIe interconnect layout is obtained for a given device.

On a router platform, where the hardware layout is well understood, a lookup table in the form of: [Device==>'pci topology path'] can be obtained and made available to application software from the hardware schematic information. At run time, the B:D.F information is appended to that table such as: [Device==>'pci topology path'==>B:D.F]. The 'PCI topology path' transparency in a virtualized environment is achieved by the hypervisor layer, which can maintain an extra field in the lookup table such as: [Device==>'pci topology path'==>B:D.F==>vB:vD.vF], where a para-virtual interface to that table can be suitably provided. Note that on a router platform, arrays of identical ASICS devices are directly assigned to Virtual Machines using common techniques such as pass-through OR device assignment. Hence, the only mechanism for device driver software within the virtual machine to derive the correspondence between the assigned devices to the physical devices on the motherboard is the 'PCI topology path.'

Figure 6:
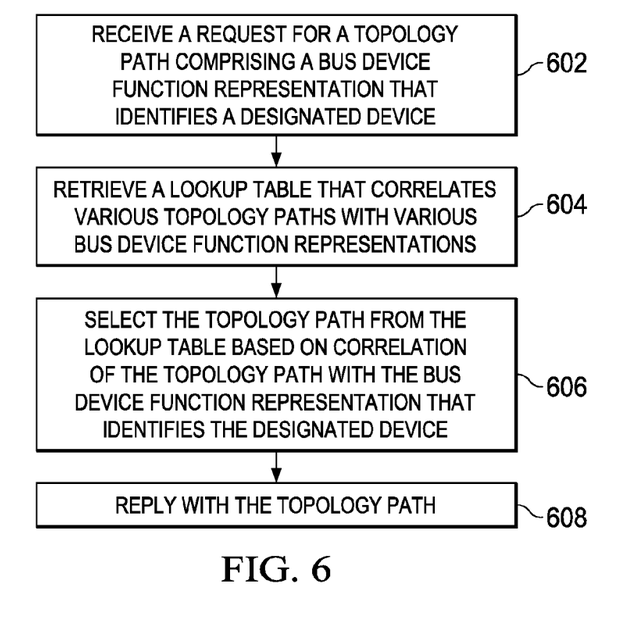
FIG. 6 is a flow diagram illustrating activities associated with providing a topology path according to at least one example embodiment.

FIG. 6 is a flow diagram illustrating activities associated with providing a topology path according to at least one example embodiment. In at least one example embodiment, there is a set of operations that corresponds to the activities of FIG. 6. An apparatus, for example switch 36 of FIG. 2, or a portion thereof, may utilize the set of operations. The apparatus may comprise means, including, for example processor 60 of FIG. 2, for performance of such operations. In an example embodiment, an apparatus, for example switch 36 of FIG. 2, is transformed by having memory, for example memory element 62 of FIG. 2, comprising computer code configured to, working with a processor, for example processor 60 of FIG. 2, cause the apparatus to perform set of operations of FIG. 6.

In at least one example embodiment, there may be a lookup table that correlates various topology paths with various bus device function representations. In at least one example embodiment, a lookup table relates to any structure that allows retrieval of information in response to a reference of the table. For example a lookup table may index a topology path of a designated device by a bus device function representation of the designated device.

In at least one example embodiment, an apparatus may select a topology path of a designated device from the lookup table based, at least in part, on correlation of the topology path with the bus device function representation that identifies the designated device. For example, the apparatus may utilize the bus device function representation of the designated device as a key to retrieve an entry in the lookup table that comprises the topology path of the designated device.

At block 602, the apparatus receives a request for a topology path for a designated device, the request comprising a bus device function representation that identifies the designated device, similarly as described regarding block 502 of FIG. 5.

At block 604, the apparatus retrieves a lookup table that correlates various topology paths with various bus device function representations. The retrieval may be by way of a function call, a message, and/or the like.

At block 606, the apparatus selects the topology path from the lookup table based, at least in part, on correlation of the topology path with the bus device function representation that identifies the designated device.

At block 608, the apparatus replies with the topology path, similarly as described regarding block 506 of FIG. 5.

Figure 7:
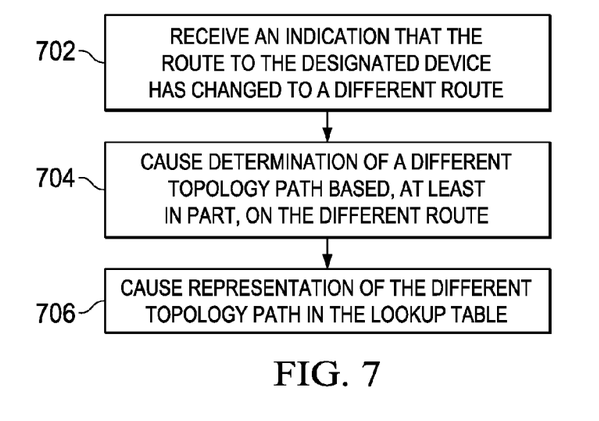
FIG. 7 is a flow diagram illustrating activities associated with providing a topology path according to at least one example embodiment.

FIG. 7 is a flow diagram illustrating activities associated with providing a topology path according to at least one example embodiment. In at least one example embodiment, there is a set of operations that corresponds to the activities of FIG. 7. An apparatus, for example switch 36 of FIG. 2, or a portion thereof, may utilize the set of operations. The apparatus may comprise means, including, for example processor 60 of FIG. 2, for performance of such operations. In an example embodiment, an apparatus, for example switch 36 of FIG. 2, is transformed by having memory, for example memory element 62 of FIG. 2, comprising computer code configured to, working with a processor, for example processor 60 of FIG. 2, cause the apparatus to perform set of operations of FIG. 7.

In some circumstances, a bus device function representation may become outdated. For example, buses, devices, and/or the like, may be added, may be removed, and/or the like. In such an example, the bus device function representation may refer to a bus or a device that is no longer in the network. In such circumstances, it may be desirable to correct such out of date assignments by causing operation of the enumeration algorithm, again.

In this manner, it may be desirable to take measures to update topology path information. In at least one example embodiment, an apparatus receives an indication that the route to the designated device has changed to a different route. For example, the apparatus may receive a hot log. In at least one example embodiment, a hot log relates to information indicative of addition of a device to the network, of removal of a device from the network, and or the like. The apparatus may evaluate topology information associated with a device indicated in the hot log to determine a topology path associated with the indicated device. The apparatus may provide this determined topology path in response to future requests for a topology path associated with the identified device. For example, the apparatus may cause a lookup table to be updated to reflect the topology path of the identified device.

At block 702, the apparatus receives an indication that the route to a designated device has changed to a different route. At block 704, the apparatus causes determination of a different topology path based, at least in part, on the different route. Determination of the different topology path may be similar as described regarding FIG. 8, FIG. 9, and/or the like. At block 706, the apparatus causes representation of the different topology path in the lookup table. For example the apparatus may replace an existing entry in the lookup table associated with the designated device, may remove an existing entry in the lookup table associated with the designated device, may add an entry to the lookup table that reflects the different topology path, and/or the like.

For example, if the indication that the route has changed relates to an indication that the designated device has been removed, determination of the different topology path may relate to determination of a null topology path, and causation of representation of the different topology path in the lookup table may relate to removing the topology path from the lookup table.

In another example, if the indication that the route has changed relates to an indication that the designated device has been added, causation of representation of the different topology path in the lookup table may relate to adding the different topology path to the lookup table.

Figure 8:
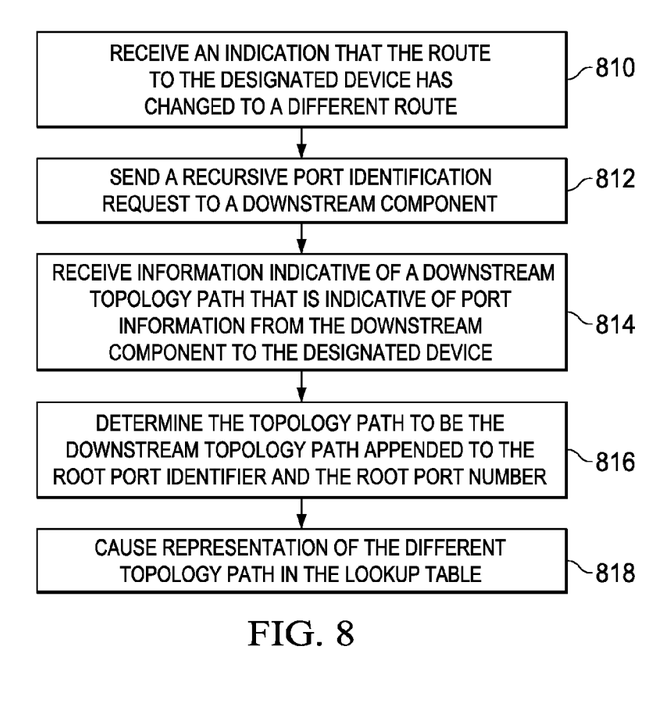
FIG. 8 is a flow diagram illustrating activities associated with providing a topology path according to at least one example embodiment.

FIG. 8 is a flow diagram illustrating activities associated with providing a topology path according to at least one example embodiment. In at least one example embodiment, there is a set of operations that corresponds to the activities of FIG. 8. An apparatus, for example switch 36 of FIG. 2, or a portion thereof, may utilize the set of operations. The apparatus may comprise means, including, for example processor 60 of FIG. 2, for performance of such operations. In an example embodiment, an apparatus, for example switch 36 of FIG. 2, is transformed by having memory, for example memory element 62 of FIG. 2, comprising computer code configured to, working with a processor, for example processor 60 of FIG. 2, cause the apparatus to perform set of operations of FIG. 8.

As previously described, an apparatus may determine a topology path associated with a designated device. In at least one example embodiment, the apparatus may determine a topology path of a device by causing traversal of a route to the device, and storing information indicative of port information along the route. In at least one example embodiment, causing determination of a topology path comprises sending a recursive port identification request to a downstream component and receiving information indicative of a downstream topology path that is indicative of port information from the downstream component to the designated device. A recursive port identification request may be similar as described regarding FIG. 9. In at least one example embodiment, a downstream topology path relates to a topology path that represents a route from the next downstream device and the designated device. The apparatus may determine the topology path by supplementing the downstream topology path with the root port identifier and the root port number.

At block 802, the apparatus receives an indication that the route to a designated device has changed to a different route, similarly as described regarding block 702 of FIG. 7. At block 804, the apparatus sends a recursive port identification request to a downstream component.

At block 806, the apparatus receives information indicative of a downstream topology path that is indicative of port information from the downstream component to the designated device. The information indicative of a downstream topology path may be, at least part of, a topology path, or any other information that indicates, at least part of, the route from the downstream device to the designated device.

At block 808, the apparatus appends the downstream topology path to the root port identifier and the root port number to determine the topology path of the designated device.

At block 810, the apparatus causes representation of the different topology path in the lookup table, similarly as described regarding block 706 of FIG. 7.

Figure 9:
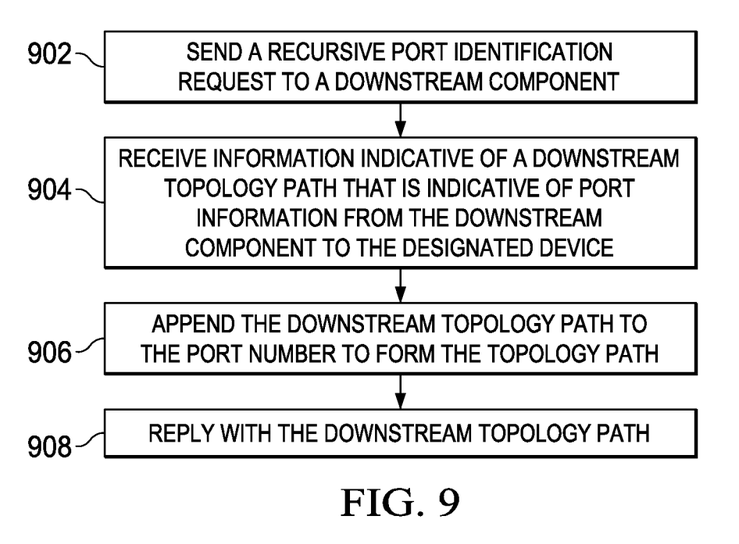
FIG. 9 is a flow diagram illustrating activities associated with topology path determination according to at least one example embodiment.

FIG. 9 is a flow diagram illustrating activities associated with topology path determination according to at least one example embodiment. In at least one example embodiment, there is a set of operations that corresponds to the activities of FIG. 9. An apparatus, for example switch 36 of FIG. 2, or a portion thereof, may utilize the set of operations. The apparatus may comprise means, including, for example processor 60 of FIG. 2, for performance of such operations. In an example embodiment, an apparatus, for example switch 36 of FIG. 2, is transformed by having memory, for example memory element 62 of FIG. 2, comprising computer code configured to, working with a processor, for example processor 60 of FIG. 2, cause the apparatus to perform set of operations of FIG. 9.

As previously described, an apparatus may send a recursive port identification request, for example to determine, at least part of, a topology path associated with a designated device. In at least one example embodiment, the recursive port identification request relates to a directive to the downstream component that causes the downstream component to. For example, the directive may be a command, a function call, a message, and/or the like, that invokes operations on the downstream device to allow for return of the downstream topology path. For example, the downstream device may send another recursive port identification request to another downstream device.

The example of FIG. 9 may relate to operations that a downstream component performs based, at least in part, on receipt of a recursive port identification request.

At block 902, the apparatus sends another recursive port identification request to a different downstream component that is downstream from the downstream component.

At block 904, the apparatus receives information indicative of another downstream topology path that is indicative of port information from the other downstream component to the designated device.

At block 906, the apparatus appends the other downstream topology path to the downstream port number to form the downstream topology path. In this manner, the downstream topology path may represent the downstream component performing the operations of FIG. 9, and any other downstream components between the downstream component and the designated device.

At block 908, the apparatus replies with the downstream topology path.

Figure 10:
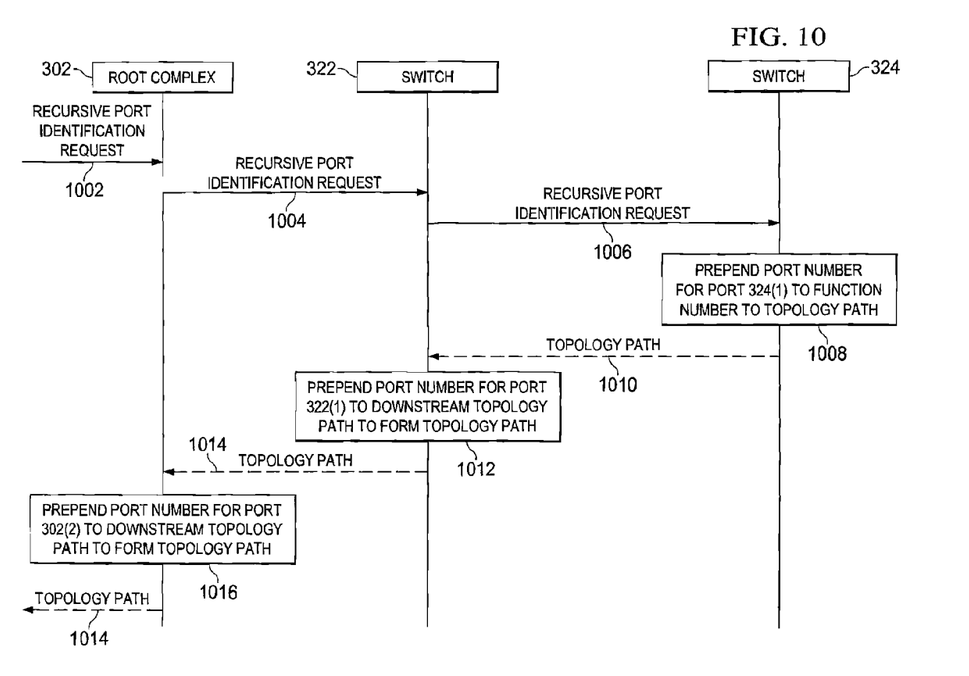
FIG. 10 is a diagram illustrating interaction associated with topology path determination according to at least one example embodiment.

FIG. 10 is a diagram illustrating interaction associated with topology path determination according to at least one example embodiment. The example of FIG. 10 is merely an example of interaction associated with topology path determination, and does not limit the scope of the claims. For example, operations attributed to a component may vary, number of components may vary, composition of a component may vary, and/or the like. For example, in some example embodiments, operations attributable to one component of the example of FIG. 10 may be allocated to one or more other components.

The example of FIG. 10 relates to determination of a topology path for device 314 of FIG. 3. At interaction 1002, root complex 302 receives a recursive port identification request. Upon receipt of the recursive port identification request, root complex 302 may perform block 902 of FIG. 9 to send a recursive port identification request to switch 322, at interaction 1004. Upon receipt of the recursive port identification request, switch 322 may perform block 902 of FIG. 9 to send a recursive port identification request to switch 324 at interaction 1006. Upon receipt of the recursive port identification request, switch 324 may identify that device 314 is in communication with port 324(1). Upon such determination, switch 324 may prepend, at block 1008, the port number for port 324(1) to a designated function number, if any, to form the downstream topology path for switch 324.

At interaction 1010, switch 324 replies to switch 322 with the downstream topology path for switch 324. Upon receipt of the downstream topology path for switch 324, switch 322 prepends, at block 1012, the port number for port 322(1) to the downstream topology path for switch 324 to form the downstream topology path for switch 322. At interaction 1014, switch 322 replies to root complex 302 with the downstream topology path for switch 322. Upon receipt of the downstream topology path for switch 322, root complex 302 prepends, at block 1016, the port number for port 302(2) to the downstream topology path for switch 322 to form the downstream topology path for root complex 302. At interaction 1018, root complex 302 replies with the downstream topology path for root complex 302.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, server 26. In some embodiments, one or more of these features may be implemented in hardware, provided external to these elements, or consolidated in any appropriate manner to achieve the intended functionality. The various network elements (e.g., control plane 32, cloud gateways 20, 22, and DVS 24) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, elements described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 49) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 60) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 62) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
   at least one processor; and
   at least one memory, the memory comprising computer code that, when executed by the processor, cause the apparatus to:
   receive a request for a topology path for a designated device, the request comprising a bus device function representation that identifies the designated device;
   determine the topology path based, at least in part, on the bus device function representation such that the topology path provides a deterministic representation of a route to the designated device; and
   reply with the topology path.

2. The apparatus of claim 1, wherein the topology path comprises a root port identifier, a root port number, and a function number.

3. The apparatus of claim 2, wherein the topology path comprises a downstream port number that identifies a port of a downstream component that comprises a part of the route to the designated device.

4. The apparatus of claim 1, wherein determination of the topology path comprises:
   retrieval of a lookup table that correlates various topology paths with various bus device function representations; and
   selection of the topology path from the lookup table based, at least in part, on correlation of the topology path with the bus device function representation that identifies the designated device.

5. The apparatus of claim 4, wherein the memory comprises computer code that, when executed by the processor, cause the apparatus to:
   receive an indication that the route to the designated device has changed to a different route;
   cause determination of a different topology path based, at least in part, on the different route; and
   cause representation of the different topology path in the lookup table.

6. The apparatus of claim 5, wherein causing determination of the different topology path comprises:
   sending a recursive port identification request to a downstream component;
   receiving information indicative of a downstream topology path that is indicative of port information from the downstream component to the designated device; and
   appending the downstream topology path to the root port identifier and the root port number.

7. The apparatus of claim 6, wherein the recursive port identification request relates to a directive to the downstream component that causes the downstream component to:
   send another recursive port identification request to a different downstream component that is downstream from the downstream component;
   receive information indicative of another downstream topology path that is indicative of port information from the other downstream component to the designated device;
   append the other downstream topology path to the downstream port number to form the downstream topology path; and
   reply with the downstream topology path.

8. At least one non-transitory computer readable medium comprising computer code that, when executed by a processor, causes an apparatus to:
   receive a request for a topology path for a designated device, the request comprising a bus device function representation that identifies the designated device;
   determine the topology path based, at least in part, on the bus device function representation such that the topology path provides a deterministic representation of a route to the designated device; and
   reply with the topology path.

9. The medium of claim 8, wherein the topology path comprises a root port identifier, a root port number, and a function number.

10. The medium of claim 9, wherein the topology path comprises a downstream port number that identifies a port of a downstream component that comprises a part of the route to the designated device.

11. The medium of claim 8, wherein determination of the topology path comprises:
   retrieval of a lookup table that correlates various topology paths with various bus device function representations; and
   selection of the topology path from the lookup table based, at least in part, on correlation of the topology path with the bus device function representation that identifies the designated device.

12. The medium of claim 11, further comprising computer code that, when executed by a processor, causes the apparatus to:
   receive an indication that the route to the designated device has changed to a different route;
   cause determination of a different topology path based, at least in part, on the different route; and
   cause representation of the different topology path in the lookup table.

13. The medium of claim 12, wherein causing determination of the different topology path comprises:
   sending a recursive port identification request to a downstream component;
   receiving information indicative of a downstream topology path that is indicative of port information from the downstream component to the designated device; and
   appending the downstream topology path to the root port identifier and the root port number.

14. The medium of claim 13, wherein the recursive port identification request relates to a directive to the downstream component that causes the downstream component to:
   send another recursive port identification request to a different downstream component that is downstream from the downstream component;
   receive information indicative of another downstream topology path that is indicative of port information from the other downstream component to the designated device;
   append the other downstream topology path to the downstream port number to form the downstream topology path; and
   reply with the downstream topology path.

15. A method comprising:
   receiving a request for a topology path for a designated device, the request comprising a bus device function representation that identifies the designated device;
   determining the topology path based, at least in part, on the bus device function representation such that the topology path provides a deterministic representation of a route to the designated device; and
   replying with the topology path.

16. The method of claim 15, wherein the topology path comprises a root port identifier, a root port number, and a function number.

17. The method of claim 16, wherein the topology path comprises a downstream port number that identifies a port of a downstream component that comprises a part of the route to the designated device.

18. The method of claim 15, wherein determination of the topology path comprises:
   retrieval of a lookup table that correlates various topology paths with various bus device function representations; and
   selection of the topology path from the lookup table based, at least in part, on correlation of the topology path with the bus device function representation that identifies the designated device.

19. The method of claim 18, further comprising:
   receive an indication that the route to the designated device has changed to a different route;
   cause determination of a different topology path based, at least in part, on the different route; and
   cause representation of the different topology path in the lookup table.

20. The method of claim 19, wherein causing determination of the different topology path comprises:
   sending a recursive port identification request to a downstream component;
   receiving information indicative of a downstream topology path that is indicative of port information from the downstream component to the designated device; and
   appending the downstream topology path to the root port identifier and the root port number.

\* \* \* \* \*